June 12, 1951     R. C. WEBSTER     2,556,458
STATIC ELECTRICITY INDICATOR
Filed Feb. 9, 1948

INVENTOR.
Raymond C. Webster
BY
ATTORNEY.

Patented June 12, 1951

2,556,458

UNITED STATES PATENT OFFICE 2,556,458

STATIC ELECTRICITY INDICATOR

Raymond C. Webster, Kansas City, Mo., assignor to W. E. Anderson, Inc., a corporation of Missouri Application February 9, 1948, Serial No. 7,212

1 Claim. (Cl. 171—95)

This invention relates to static electricity indicators, and more particularly to an electric device capable when placed in use, of positively detecting and indicating to the user thereof the presence of statical electricity in virtually any body.

It is a fundamental principle of electricity that when two bodies come into frictional contact with each other, static electricity is created in each of said bodies and this phenomenon is generally covered by the field of electrostatics. The presence of such static electricity, whether it consists of negative or positive charges, is oftentimes disadvantageous and many cases dangerous. The danger factor is most predominant in the field of medicine, particularly in zones of anesthesia where explosions are common because of a spark discharge of static electricity.

It is the primary object of this invention, therefore, to provide an inexpensive and easily operated relatively small portable device capable of quickly detecting and indicating the presence of static electricity in any body, to the end that such electrical charges may be subsequently removed in any of the manners well known to those skilled in the art.

The most important object of this invention is the provision of an indicator of static electricity having an electrical circuit provided wth means for indicating the intensity of current in such circuit and structure for varying said intensity when parts of the device are brought into close inductive relationship to the body containing such static electrical charges.

Another important object of this invention is to provide a device of the aforementioned character operable upon the well known principle that similar electrified bodies repel each other, while oppositely electrified bodies attract each other and having means for visually indicating such repelling or attracting action when the device is brought into close proximity with the body to be tested.

A further object of this invention is to provide means in a device of the above mentioned character for reestablishing the normal intensity of the current in the electric circuit after a body has once been tested without first de-energizing the circuit.

Other objects of this invention include the arrangement of parts within a specially designed case for rendering the entire instrument portable and easily handled; the way in which the manual manipulatable parts thereof, as well as the visual indicating means are conveniently disposed upon the case and obviously the inner connection of electrical elements to render the device operable in the manner above set forth.

Other objects of this invention will be made clear or become apparent during the course of the following specification, reference being had to the accompanying drawing, wherein.

Figure 1:
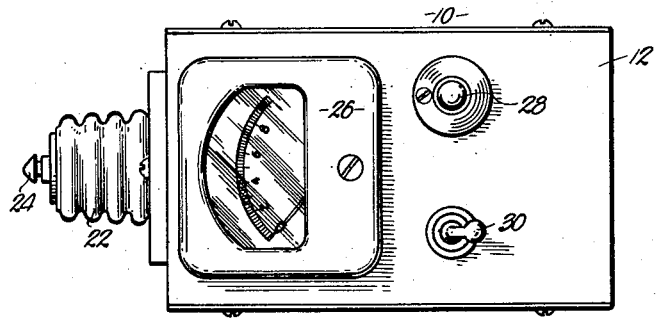
Fig. 1 is a top plan view of a static electric indicator made in accordance with the present invention.

As above indicated, the presence of electrical charges taking the form of static electricity in various objects, including the human body, may in many instances be very detrimental to an attempted result, particularly in the field of medicine. It becomes desirous, therefore, to have means for quickly and easily indicating the presence of such static charges to the end that steps may be taken to eliminate the same. Oftentimes such electrical charges in an operating room present in the body of the surgeon himself, in the instruments he might use, in the body of his patient, and elsewhere, cause fatal explosions when created in the presence of highly combustible gases.

Referring now more particularly to the drawing, the numeral 10 designates broadly a hollow case having a top wall 12 and an opposed bottom wall provided with a number of feet 14 secured thereto. This case 10 is also provided with opposed end walls and opposed side walls, one of the latter of which constitutes a plate 16 removably mounted by means of a number of screws or the like 20. An insulator 22 formed from porcelain or the like is secured directly to one of the end walls of body 10 and this insulator 22 has a central opening therethrough, not shown, for receiving an elongated rod 24 produced from any highly conductive material. The innermost end of this rod 34 terminates within the confines of case 10.

Figure 2:
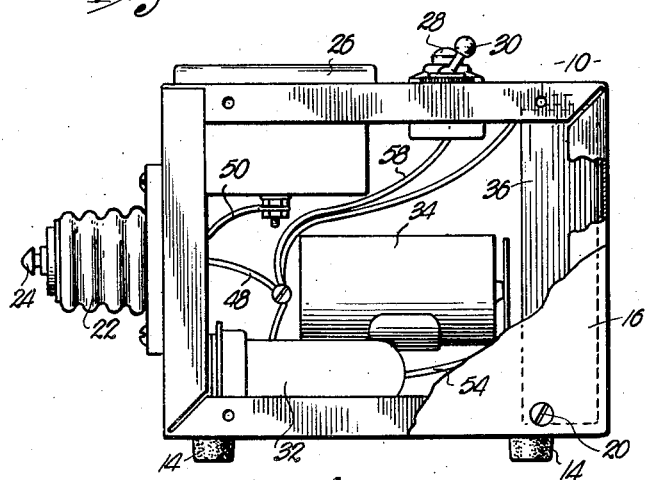
Fig. 2 is a side elevational view thereof, parts of a side cover plate being broken away to reveal arrangement of parts.

A milliammeter 26 or other means for measuring electrical current is mounted directly upon the wall 12 of case 10 and extends inwardly into case 10 as clearly indicated in Fig. 2 of the drawing. A pair of switches 28 and 30 are also mounted upon the uppermost wall 12 of case 10, the switch 28 preferably being of the spring loaded type, said spring yieldably holding such switch 28 normally open. The switch 30 is a conventional toggle type obtainable upon the open market. These switches 29 and 30 likewise extend below the innermost face of wall 12. An electron tube 32, and a pair of batteries 34 and 36 are also mounted within the case 10 in a manner indicated in Fig. 2.

Figures 3, 4:
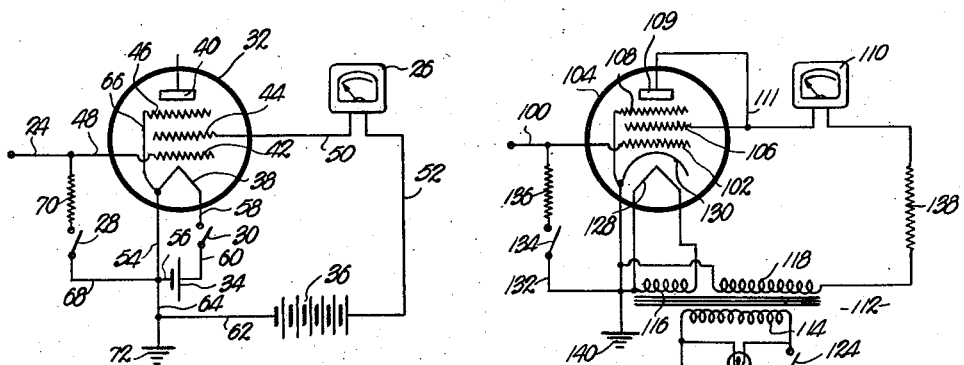
Fig. 3 is a schematic wiring diagram showing the electrical assembly of the device.
Fig. 4 is a schematic wiring diagram showing a modified form of electrical construction.

Referring now to Fig. 3 of the drawing, the electrical connection between conductor 24, tube 32, meter 26, batteries 34 and 36 and switches 28 and 30, will be described. The electron tube 32 chosen for illustration is a conventional pentode having five electrodes in the usual manner. These electrodes include a filament or cathode 38 heated by current passing therethrough, an anode or plate 40, a control grid 42, a screen grid 44 and the usual suppressor grid 46. The control grid 42 of tube 32 is connected directly to the innermost end of conductor 24 by means of a wire 48. The meter 26 has connection with the screen grid 44 by means of a wire 50, and a wire 52 joins the meter 26 with one side of the battery 36. Filament 38 receives energy from battery 34 by means of wires 54, 56, 58 and 60. Plate 40 of tube 32 has no connection in the circuit, grid 44 being closer to cathode 38 and serving as a plate.

As indicated in Fig. 3, the toggle switch 30 is interposed between the wires 58 and 60 and when the switch 30 is closed a complete circuit is produced through filament 38 and battery 34. The screen grid voltage is completed by wires 62, 64 and 54 joining the other side of battery 36 and the cathode 38. A wire 66 within the tube 32 joins cathode 38 and grid 46. A direct connection between grid 42 and cathode 38 is created when the switch 28 is closed by means of wire 44, a wire 68, closed switch 28, a resistor 70 and wire 48.

In operation the toggle switch 32 is manually moved to the closed position, thereby energizing and heating filament 38, such energy being produced by the battery 34. Such closing of the switch 30 also closes a circuit through tube 32, meter 26 and battery 36. Obviously the grid 42 controls the flow of negative electrons from filament 38 to grid 44 and thence to wire 50, meter 26, wire 52 to battery 36. The amount of such current flow depends on the difference in voltage between the control grid 42 and the filament 38. Because of the flow of negative charges from filament 38 to the screen grid 44, the control grid 42 is normally more negative than the filament 38. The intensity of such electrical current flowing through the tube 32 as determined by the strength of battery 36 will be indicated on the meter 26 immediately upon closing of switch 30.

As the device is moved to a position in close proximity to any body having static charges existing therein, such charges will be conducted through the rod 24 when the body is in inductive relationship to the outermost end of the conductor 24. If such charges within the body are negative, then such charges will cause like charges present in rod 24 to be driven to grid 42. The negative charges at grid 42 of tube 32 will be repelled and not allowed to pass through the electric circuit toward meter 26. The intensity of the current in such circuit will immediately decrease and such decrease of current will be indicated by meter 26. As soon as the device is moved away from the body having negative charges therein, the meter 26 will immediately return to the normal indication since the original intensity of the current in the electric circuit will be reestablished.

In the event that the conductor 24 is brought into contact with the body, such negative charges present therein will be conducted to the tube 32 and will build up to such an extent that the intensity of current in the circuit will remain diminished for a short period of time. In this event the needle of meter 26 will show a low intensity until such negative charges built up in the circuit bleed therefrom, whereupon the current will return to its normal intensity.

When such building up of negative charges occurs, the operator may reestablish the normal intensity of the current by merely closing switch 28. Closing of this switch 28 interconnecting grid 42 and filament 38 will equalize the negative charges between control grid 42 and filament 38. When switch 38 is again opened the intensity of the current will be reestablished and the device may again be used as above indicated.

The resistor 70 within the circuit above described for equalizing the static charges is of relatively high value to the end that when the switch 28 is closed, accidental contact of conductor 24 with a high voltage charge will not cause damage.

In the event that the body being tested contains positive static charges or an absence of negative electrons, such charges when received by the conductor 24 by moving the latter into inductive relationship with the charged body, will attract the negative electrons at the control grid 42 of tube 32 increasing momentarily the intensity of the current through meter 26. This action will not continue however, because the reappearance of additional negative electrons at the control grid 42 will immediately decrease the intensity of the current to its normal flow.

It is to be noted that the small flashlight type battery 34 of approximately 1½ volts may be easily changed from time to time without the necessity of replacing battery 36. This battery 36 is preferably of approximately 45 volts and will last a considerable period of time since the energization of filament 38 is created by the small battery 34.

The wiring assembly shown in Fig. 4 is essentially the same as that first described with respect to Fig. 3, with the exception that means is provided for using the device with alternating current. The direct current static charge is received by a conductor 100 having connection with a control grid 102 of an electron tube 104. A screen grid 106, a suppresser grid 108 and a plate 109 also form a part of tube 104 and grid 106 and plate 109 are connected directly to a milliammeter 110. A transformer broadly designated by the numeral 112 has a primary 114 and a pair of secondary windings 116 and 118. The primary 114 of transformer 112 is connected by means of a pair of lead lines 120 and 122 to a suitable source of alternating current electrical energy, not shown. A switch 124 comparable to the switch 30 shown in Figs. 1 to 3 inclusive is interposed in lead line 122. A small lamp 126 electrically joined to the lines 120 and 122 indicates when current is flowing into the transformer 112, since this lamp 126 is interposed between the switch 124 and the primary 114 of transformer 112.

The screen grid voltage is obtained through the secondary winding 118 of transformer 112 having direct connection with a cathode 130 of tube 104, A filament 128 for cathode 130 is heated through connection with secondary 116 of transformer 112, the cathode 130 and control grid 102 of tube 104 are joined by a line 132 having a switch 134 interposed therein, comparable to the switch 28 above described, and a high resistance 136. A resistor 138 interposed between meter 110 and secondary 118 of transformer 112 is chosen to control the intensity of the screen grid voltage as determined by the voltage produced by secondary winding 118. It is clear that the arrangement set forth in Fig. 4 will operate precisely the same as that shown in Fig. 3 and may be used by plugging lines 120 and 122 in a conventional alternating current outlet.

As indicated at 72 in Fig. 3 and at 140 in Fig. 4, the entire circuit is suitably grounded for best results. This may be accomplished by a conductor that is separately attached to ground by the operator before use of the device, or a line joined to the case 10 if the latter is made from conductible material, whereupon the operator merely places the case 10 on such ground.

From the foregoing description it is apparent that a device has been produced that embodies all the objects and advantages above pointed out, and while preferred constructions, combinations and arrangements of parts have been shown, the right is reserved to make such changes as properly fall within the spirit and scope of the appended claim.

Having thus described the invention, what is claimed as new and desired to be secured by Letters Patent is:

A device for indicating the presence of static electricity, said device comprising a vacuum tube having a cathode, a floating anode, a floating control grid, a suppressor grid and a screen grid; a conductible probe connected with said floating control grid; an electric circuit coupled with said suppressor grid, said screen grid and said cathode; current intensity indicating means interposed in said circuit; and a shunt circuit having a switch therein interconnecting said first-mentioned circuit and said floating grid for draining electrical charges from the latter to restore normal current flow in the first-mentioned circuit after an indication of presence of static electricity by the device.

RAYMOND C. WEBSTER.

REFERENCES CITED

The following references are of record in the file of this patent:

UNITED STATES PATENTS

| Number | Name | Date |
|---|---|---|
| 1,919,215 | Gunn | July 25, 1933 |
| 1,938,136 | Crew | Dec. 5, 1933 |
| 2,145,866 | Failla | Feb. 7, 1939 |
| 2,178,954 | Dehmel | Nov. 7, 1939 |
| 2,208,329 | Morelock | July 16, 1940 |
| 2,262,916 | Boucke | Nov. 18, 1941 |
| 2,267,820 | Droz et al. | Dec. 30, 1941 |
| 2,449,068 | Gunn | Sept. 14, 1948 |
| 2,464,428 | Alven et al. | Mar. 15, 1949 |

OTHER REFERENCES

Publication "Radio Amateur's Handbook," 1946, page 412. Published by A.R.R. League Inc., Connecticut. Page 412.